(12) United States Patent
Kataoka et al.

(10) Patent No.: US 11,018,544 B2
(45) Date of Patent: May 25, 2021

(54) MOTOR

(71) Applicants: NIDEC TOSOK CORPORATION, Kanagawa (JP); NIDEC CORPORATION, Kyoto (JP)

(72) Inventors: Shigehiro Kataoka, Kanagawa (JP); Kazuhiro Homma, Kanagawa (JP); Yoshiyuki Kobayashi, Kanagawa (JP); Hideaki Uchise, Kyoto (JP); Masato Aono, Kyoto (JP); Akihiro Okita, Kyoto (JP)

(73) Assignees: NIDEC TOSOK CORPORATION, Kanagawa (JP); NIDEC CORPORATION, Kyoto (JP)

( * ) Notice: Subject to any disclaimer, the term of this patent is extended or adjusted under 35 U.S.C. 154(b) by 483 days.

(21) Appl. No.: 16/048,378

(22) Filed: Jul. 30, 2018

(65) Prior Publication Data

US 2019/0036409 A1    Jan. 31, 2019

(30) Foreign Application Priority Data

Jul. 31, 2017  (JP) .............................. JP2017-148713
Jul. 6, 2018   (JP) .............................. JP2018-129283

(51) Int. Cl.
| | | |
|---|---|---|
| *H02K 11/00* | (2016.01) | |
| *H02K 3/50* | (2006.01) | |
| *H02K 5/22* | (2006.01) | |
| *H02K 7/14* | (2006.01) | |
| *H02K 21/14* | (2006.01) | |

(Continued)

(52) U.S. Cl.
CPC ............. *H02K 3/50* (2013.01); *F04C 15/008* (2013.01); *H02K 5/225* (2013.01); *H02K 7/14* (2013.01); *H02K 21/14* (2013.01); *F04C 2/10* (2013.01); *F04C 2/102* (2013.01); *F04C 15/0073* (2013.01); *F04C 2240/30* (2013.01);

(Continued)

(58) Field of Classification Search
CPC ...... H02K 5/225; H02K 3/50; H02K 2203/06; H02K 2203/09; H02K 2205/09; H02K 2203/03; H02K 3/505; H02K 7/14; H02K 21/14
USPC .................................................. 310/71, 194
See application file for complete search history.

(56) References Cited

U.S. PATENT DOCUMENTS 10,862,363 B2 * 12/2020 Ogawa .................... H02K 3/505
2005/0189828 A1 *  9/2005 Nakayama ............ H02K 3/522
                                                        310/71

(Continued)

FOREIGN PATENT DOCUMENTS

JP    2013217223    10/2013
JP    2017053323    3/2017

*Primary Examiner* — Thanh Lam
(74) *Attorney, Agent, or Firm* — JCIPRNET (57) ABSTRACT

A motor includes a rotor having a shaft centered on a central axis that extends in an axial direction, a stator which is disposed to face the rotor and includes a plurality of coils, a housing in which the rotor and the stator are housed, and a bus bar assembly that is disposed on one side of the shaft in the axial direction, wherein the bus bar assembly includes a plurality of bus bars that are electrically connected to the plurality of coils of the stator and a bus bar holder that holds the plurality of bus bars, and wherein at least one bus bar among the plurality of bus bars is placed on a disposition surface part provided on the bus bar holder and extends in a direction crossing the central axis.

13 Claims, 7 Drawing Sheets

(51) Int. Cl.
 F04C 15/00 (2006.01)
 F04C 2/10 (2006.01)
(52) U.S. Cl.
 CPC ...... *F04C 2240/40* (2013.01); *H02K 2203/03* (2013.01); *H02K 2203/09* (2013.01)

(56) References Cited

U.S. PATENT DOCUMENTS

2011/0187226 A1* 8/2011 Sagara .................. H02K 15/12
 310/254.1
2015/0295371 A1* 10/2015 Houzumi ........... H02K 11/0094
 310/71
2017/0201148 A1* 7/2017 Haga .................... H02K 5/225

* cited by examiner

MOTOR

CROSS-REFERENCE TO RELATED APPLICATION

This application claims the priority benefits of Japan patent applications serial no. 2017-148713, filed on Jul. 31, 2017 and serial no. 2018-129283, filed on Jul. 6, 2018. The entirety each of the above-mentioned patent applications is hereby incorporated by reference herein and made a part of specification.

BACKGROUND

Technical Field

The present disclosure relates to a motor.

Description of Related Art

For example, in Japanese Laid-open Publication No. 2013-217223 and Japanese Laid-open Publication No. 2017-053323, an electric pump in which a motor having a circuit board and a pump are integrated is described. In such a circuit board, a coil end of a coil that extends from a stator of a motor is electrically directly connected to the circuit board.

On the other hand, in a circuit board mounted on the motor, the coil end of the coil may be connected to the circuit board via a bus bar provided in the bus bar holder. The bus bar has one end that is connected to the coil end and the other end that is connected to the circuit board and the coil and the circuit board are electrically connected.

When a circuit board is mounted on a motor including a bus bar holder, since a position of a circuit board connection terminal of the bus bar connected to the circuit board shifts with respect to the bus bar holder, and a position of the bus bar holder shifts with respect to the motor, it may be difficult to connect the circuit board connection terminal and the circuit board. Therefore, there is a demand for disposing the bus bar and the bus bar holder with respect to the motor with high positional accuracy.

In addition, since the bus bar is made of a relatively expensive material, there is a demand for reducing the cost of the bus bar.

SUMMARY

An exemplary first embodiment of the present disclosure is a motor including a rotor having a shaft centered on a central axis that extends in an axial direction of the shaft; a stator which is disposed to face the rotor and includes a plurality of coils; a housing in which the rotor and the stator are housed; and a bus bar assembly that is disposed on one side of the shaft in the axial direction, wherein the bus bar assembly includes a plurality of bus bars that are electrically connected to the plurality of coils of the stator and a bus bar holder that holds the plurality of bus bars, and wherein at least one bus bar among the plurality of bus bars is placed on a disposition surface part provided on the bus bar holder and extends in a direction crossing the central axis.

The above and other elements, features, steps, characteristics and advantages of the present disclosure will become more apparent from the following detailed description of the embodiments with reference to the attached drawings.

DESCRIPTION OF THE EMBODIMENTS

An embodiment of the present disclosure is to provide a motor in which a bus bar and a bus bar holder are disposed with respect to a motor with high positional accuracy and the cost of the bus bar is reduced.

According to the exemplary first embodiment of the present disclosure, it is possible to provide a motor in which a bus bar and a bus bar holder are disposed with respect to a motor with high positional accuracy and the cost of the bus bar can be reduced.

A motor according to an embodiment of the present disclosure will be described below with reference to the drawings. In the present embodiment, an electric oil pump in which a pump unit is disposed on one side of a motor in an axial direction and which discharges oil will be exemplified. In addition, in the following drawings, in order to allow respective configurations to be easily understood, actual structures and scales and numbers in the structures may vary.

In addition, in the drawings, an XYZ coordinate system is appropriately shown s as a three-dimensional orthogonal coordinate system. In the XYZ coordinate system, a Z axial direction is a direction parallel to the other side of a central axis J shown in FIG. 1 in the axial direction. An X axial direction is a direction parallel to an electric oil pump shown in FIG. 1 in a transverse direction, that is, a left-right direction in FIG. 1. A Y axial direction is a direction orthogonal to both the X axial direction and the Z axial direction.

In addition, in the following description, the positive side (+Z side) in the Z axial direction will be referred to as "rear side" and the negative side (−Z side) in the Z axial direction will be referred to as "front side." Here, the rear side and the front side are terms that are simply used for explanation, and do not limit actual positional relationships and directions. In addition, unless otherwise noted, a direction (the Z axial direction) parallel to the central axis J is simply defined as an "axial direction," a radial direction around the central axis J is simply defined as a "radial direction," and a circumferential direction around the central axis J, that is, a circumference (θ direction) around the central axis J is simply defined as a "circumferential direction."

Here, in this specification, the term "extending in the axial direction" includes not only extending strictly in the axial direction (the Z axial direction) but also extending in a direction inclined in a range of less than 45° with respect to the axial direction. In addition, in this specification, the term "extending in the radial direction" includes not only extending strictly in the radial direction, that is, extending in a direction perpendicular to the axial direction (the Z axial direction), but also extending in a direction inclined in a range of less than 45° with respect to the radial direction.

<Overall Structure>

Figure 1:
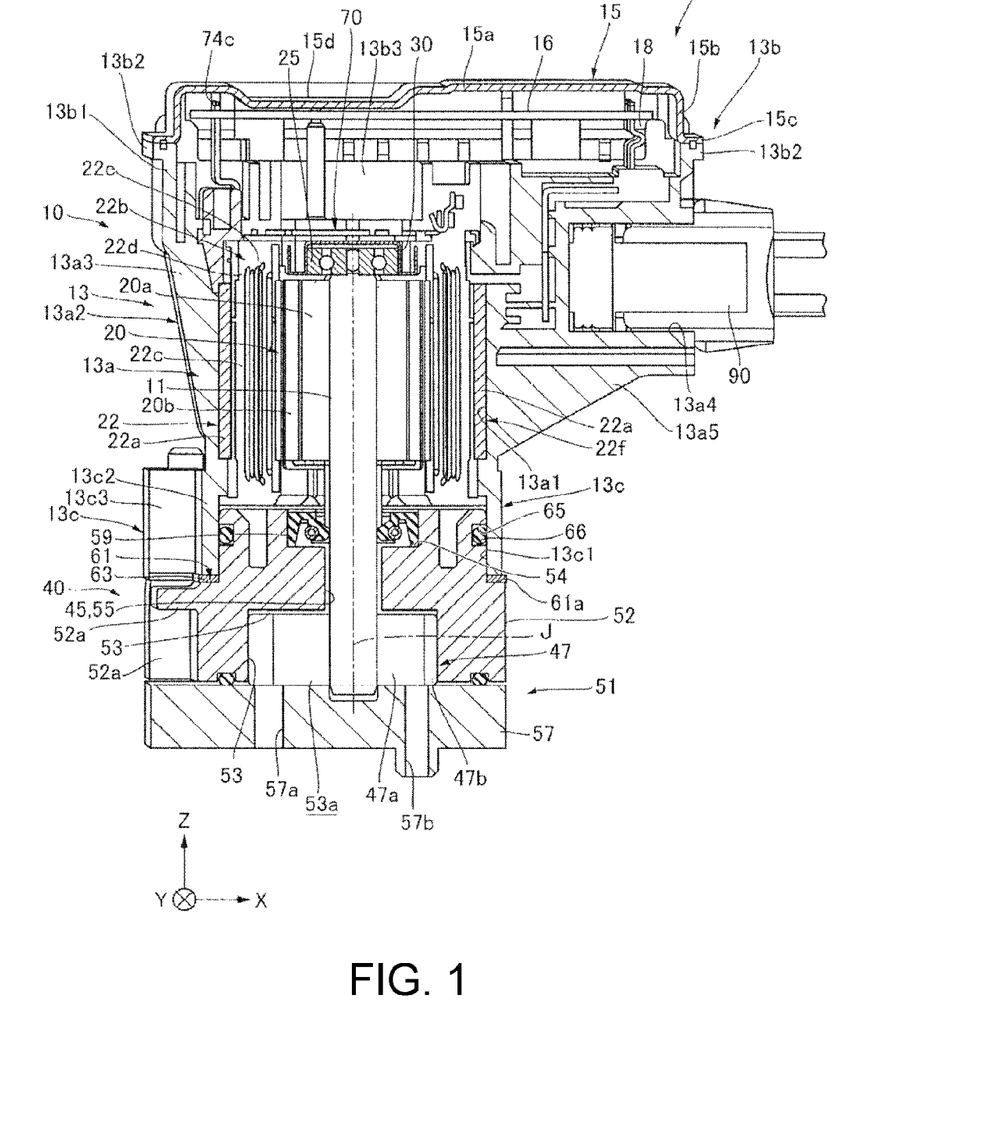
FIG. 1 is a cross-sectional view of an electric oil pump according to a first embodiment.

FIG. 1 is a cross-sectional view of an electric oil pump according to a first embodiment. As shown in FIG. 1, an electric oil pump 1 of the present embodiment includes a motor 10 and a pump 40. The motor 10 and the pump 40 are aligned in the axial direction. The motor 10 has a shaft 11 that is disposed along the central axis J that extends in the axial direction. The pump 40 is disposed on one side (front side) of the motor 10 in the axial direction and is driven by the motor 10 via the shaft 11, and discharges oil. Constituent members will be described below in detail.

<Motor 10>

As shown in FIG. 1, the motor 10 includes a resin housing 13, a rotor 20, the shaft 11, a stator 22, a rolling bearing 25, and a bus bar assembly 70.

The motor 10 is, for example, an inner rotor type motor. The rotor 20 is fixed to an outer circumferential surface of the shaft 11. The stator 22 is disposed outside the rotor 20 in the radial direction. In addition, the rolling bearing 25 is disposed at a rear side (+Z side) end of the shaft 11 and rotatably supports the shaft 11.

(Resin Housing 13)

As shown in FIG. 1, the resin housing 13 includes a stator holding part 13a, a circuit board holding part 13b, and a pump body holding part 13c. The stator holding part 13a, the circuit board holding part 13b, and the pump body holding part 13c are integrally molded using a resin.

(Stator Holding Part 13a)

The stator holding part 13a has a through-hole 13a1 that extends inwardly in the axial direction. The shaft 11 of the motor 10, the rotor 20, and the stator 22 are disposed in the through-hole 13a1. An outer surface of the stator 22, that is, an outer surface of a core back part 22a to be described below, is fitted to an inner surface of the stator holding part 13a. Thereby, the stator 22 is housed in the stator holding part 13a.

The left side of an outer wall 13a2 of the stator holding part 13a of the present embodiment in the X axial direction has a left side wall 13a3 whose thickness in the radial direction of the resin increases from the front side (−Z side) toward the rear side (+Z side). In addition, the right side of the outer wall 13a2 in the X axial direction has an insertion hole 13a4 which extends in the X axial direction and into which an external connector 90 is inserted. A bracket part 13a5 that supports the insertion hole 13a4 is provided on the front side of the insertion hole 13a4. The rigidity of the insertion hole 13a4 is strengthened by the bracket part 13a5.

(Circuit Board Holding Part 13b)

Figure 2:
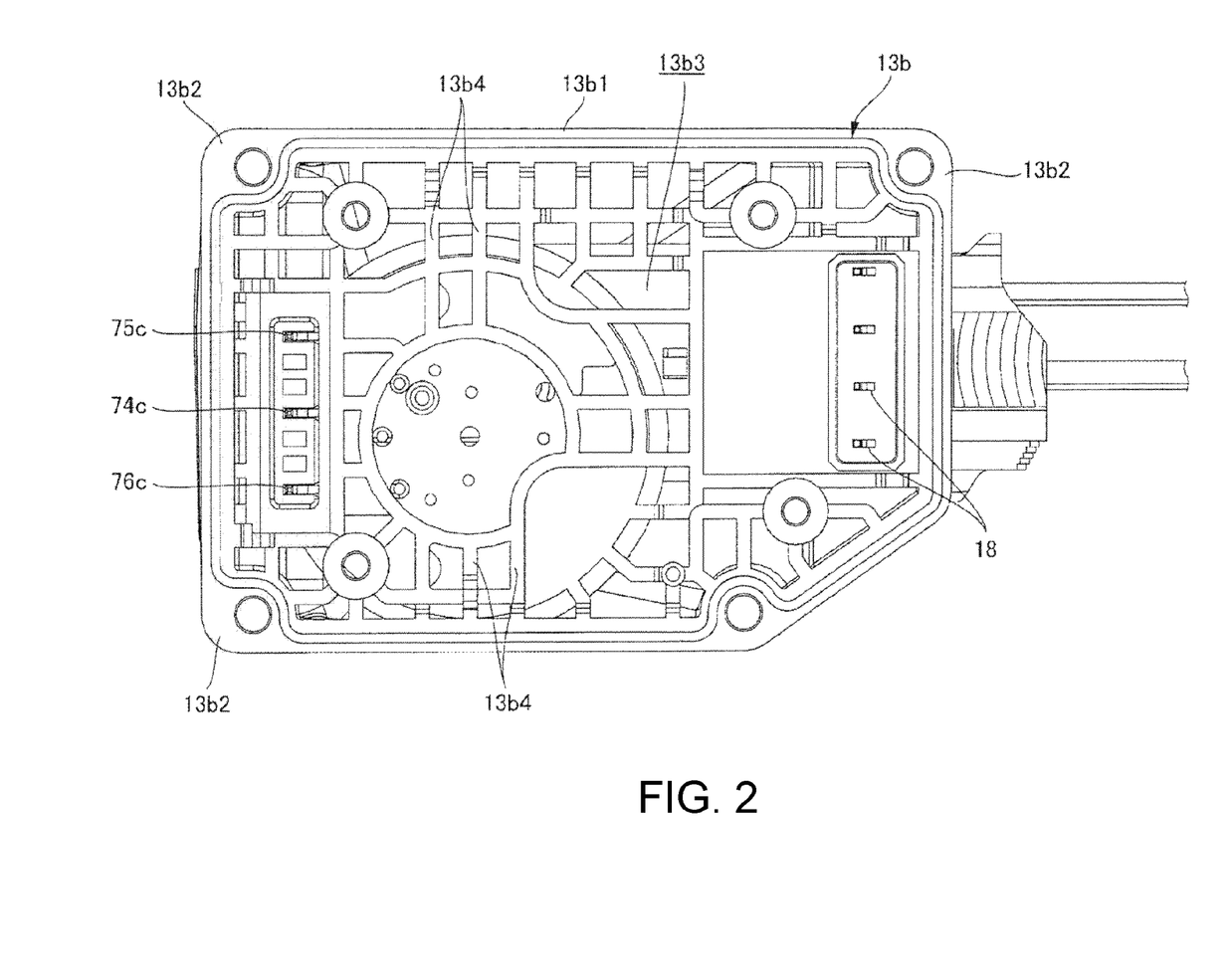
FIG. 2 is a plan view of a circuit board holding part according to the first embodiment.

FIG. 2 is a plan view of the circuit board holding part 13b according to the present embodiment. As shown in FIG. 1 and FIG. 2, the circuit board holding part 13b is continuously connected to the rear side end of the stator holding part 13a. The circuit board holding part 13b has a bottomed container shape of which the rear side opens and which extends in the X axial direction and includes a container body part 13b1 and a container body side flange part 13b2.

The container body part 13b1 has a substrate housing chamber 13b3. The rear side of the substrate housing chamber 13b3 opens, and a rear side opening of the substrate housing chamber 13b3 is covered by a cover part 15. The container body part 13b1 is integrally molded using a resin, and a plurality of projection parts 13b4 are provided at intervals on the inner surface and the bottom of the substrate housing chamber 13b3. A circuit board 16, motor side terminal parts 74c, 75c, and 76c, a connector side terminal 18, and the like are housed in the substrate housing chamber 13b3.

The motor side terminal parts 74c, 75c, and 76c are disposed on the left side in the X axial direction in the substrate housing chamber 13b3, one end side is electrically connected to a coil 22b of the motor 10, and the other end side is electrically connected to the circuit board 16. The connector side terminal 18 is disposed on the right side in the X axial direction in the substrate housing chamber 13b3, one end side is electrically connected to the external connector 90, and the other end side is electrically connected to the circuit board 16. The motor side terminal parts 74c, 75c, and 76c constitute a part of a bus bar 71 to be described below (refer to FIG. 4).

The circuit board 16 outputs a motor output signal. In the present embodiment, the circuit board 16 is disposed on the rear side of the substrate housing chamber 13b3 and extends in the X axial direction. A plurality of electronic components and a print wiring (not shown) are provided on the back surface (front side surface) of the circuit board 16. Tips of the motor side terminal parts 74c, 75c, and 76c protrude and are electrically connected to the left side of the circuit board 16 in the X axial direction. In the present embodiment, the three motor side terminal parts 74c, 75c, and 76c are connected to the circuit board 16 at intervals in the Y axial direction. In addition, when a copper inlay substrate is used as the circuit board 16, heat generated in a heating element (not shown) can be dissipated through the cover part 15.

The cover part 15 is made of a metal material, and since it has a large thermal capacity and has a surface area, a heat dissipation effect is strong. In the present embodiment, the cover part 15 includes a top part 15a that extends along the circuit board 16, a side wall 15b that extends from the outer edge of the top part 15a to the front side, and a cover side flange part 15c that protrudes outwardly from the front side end of the side wall 15b.

The cover side flange part 15c is disposed to face the container body side flange part 13b2 provided in the container body part 13b1, and is fixed to the container body side flange part 13b2 by a fastening unit such as a bolt. The top part 15a has a recess 15d that is recessed toward the circuit board 16 on the left side in the X axial direction. A tip of the recess 15d is in contact with the circuit board 16 with a heat transfer member (not shown) therebetween. Thus, heat generated from the circuit board 16 can be effectively dissipated through the heat transfer member and the cover part 15.

(Pump Body Holding Part 13c)

As shown in FIG. 1, the pump body holding part 13c has a tubular shape of which the front side opens and is continuously connected to the front side end of the stator holding part 13a. The pump body holding part 13c has a hole 13c1 that extends inwardly in the axial direction. The inner diameter of the hole 13c1 has a size that is slightly larger than the outer diameter on the rear side of a pump body 52 of the pump 40 to be described below. The rear side of the pump body 52 is fitted to the inner surface of the hole 13c1.

An outer surface 13c2 of the pump body holding part 13c includes a motor side flange part 13c3 that protrudes in the radial direction. The motor side flange part 13c3 is disposed to face a pump side flange part 52a provided in the pump body 52 to be described below, and is fixed to the pump side flange part 52a by a fastening unit such as a bolt. Thereby, the pump 40 is fixed to the resin housing 13.

(Rotor 20)

The rotor 20 includes a rotor core 20a and a rotor magnet 20b. The rotor core 20a surrounds the shaft 11 around the axis (θ direction) and is fixed to the shaft 11. The rotor magnet 20b is fixed to the outer surface along the axis (θ direction) of the rotor core 20a. The rotor core 20a and the rotor magnet 20b rotate together with the shaft 11. Here, the rotor 20 may be an embedded magnet type in which a permanent magnet is embedded in the rotor 20. Compared to a surface magnet type in which a permanent magnet is provided on a surface of the rotor 20, the rotor 20 of the embedded magnet type can reduce a likelihood of the magnet peeling off due to a centrifugal force, and can utilize a reluctance torque positively.

(Stator 22)

The stator 22 surrounds the rotor 20 around the axis (θ direction), and rotates the rotor 20 around the central axis J. The stator 22 includes the core back part 22a, a tooth part 22c, the coil 22b, and an insulator (bobbin) 22d.

The shape of the core back part 22a is a cylindrical shape concentric with the shaft 11. The tooth part 22c extends from the inner surface of the core back part 22a toward the shaft 11. A plurality of tooth parts 22c are provided and are disposed at uniform intervals in the circumferential direction on the inner surface of the core back part 22a. The coil 22b is provided around the insulator (bobbin) 22d and is formed by winding a conductive wire 22e. An insulator (bobbin) 19 is installed to each of the tooth parts 22c. The stator 22 includes a resin molded part 22f in which the core back part 22a, the tooth part 22c, the coil 22b, and the insulator (bobbin) 22d are covered with a resin when integral molding using a resin is performed.

(Rolling Bearing 25)

The rolling bearing 25 is disposed on the rear side (+Z side) of the rotor 20 and the stator 22 and is held by a rolling bearing holding part 30. The rolling bearing 25 supports the shaft 11. The shape, the structure, and the like of the rolling bearing 25 are not particularly limited, and any known bearing can be used.

(Shaft 11)

As shown in FIG. 1, the shaft 11 extends along the central axis J and penetrates through the motor 10. The front side (−Z side) of the shaft 11 protrudes from the motor 10 and extends into the pump 40. The front side (−Z side) of the shaft 11 is supported by a sliding bearing 45 in the pump body 52 to be described below.

(Bus Bar Assembly 70)

Figure 3:
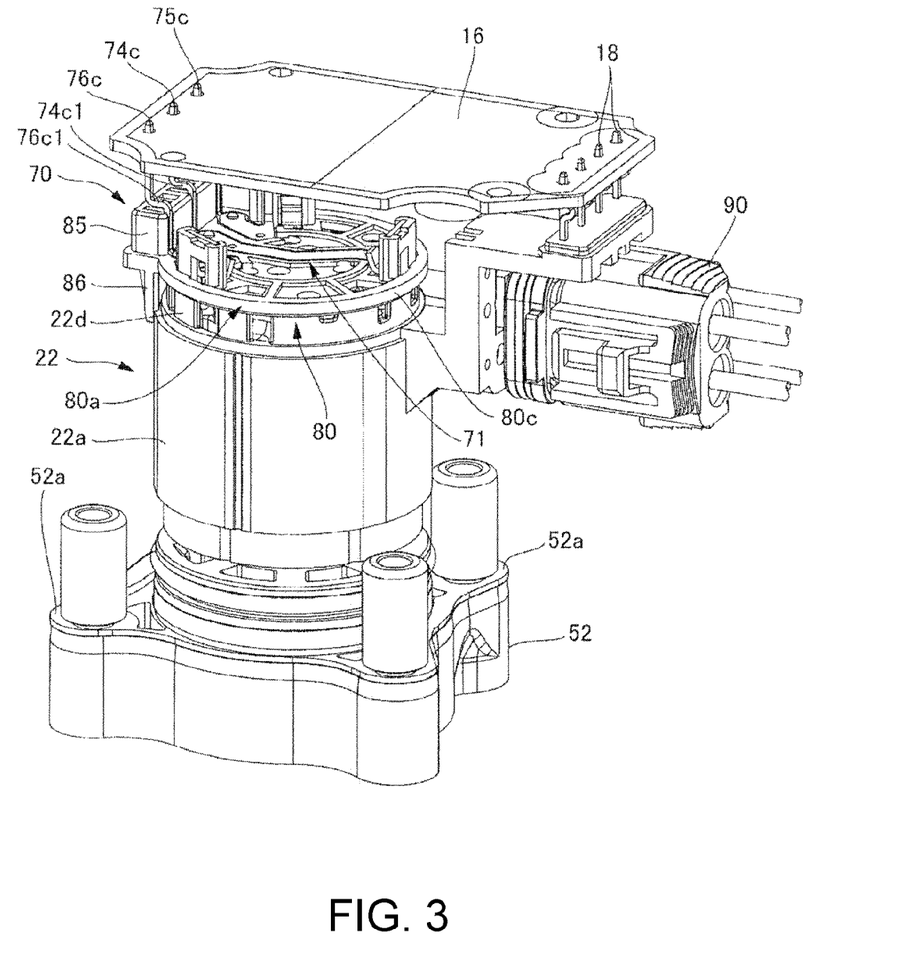
FIG. 3 is an internal perspective view of a motor including a bus bar holder according to the first embodiment.
Figure 4:
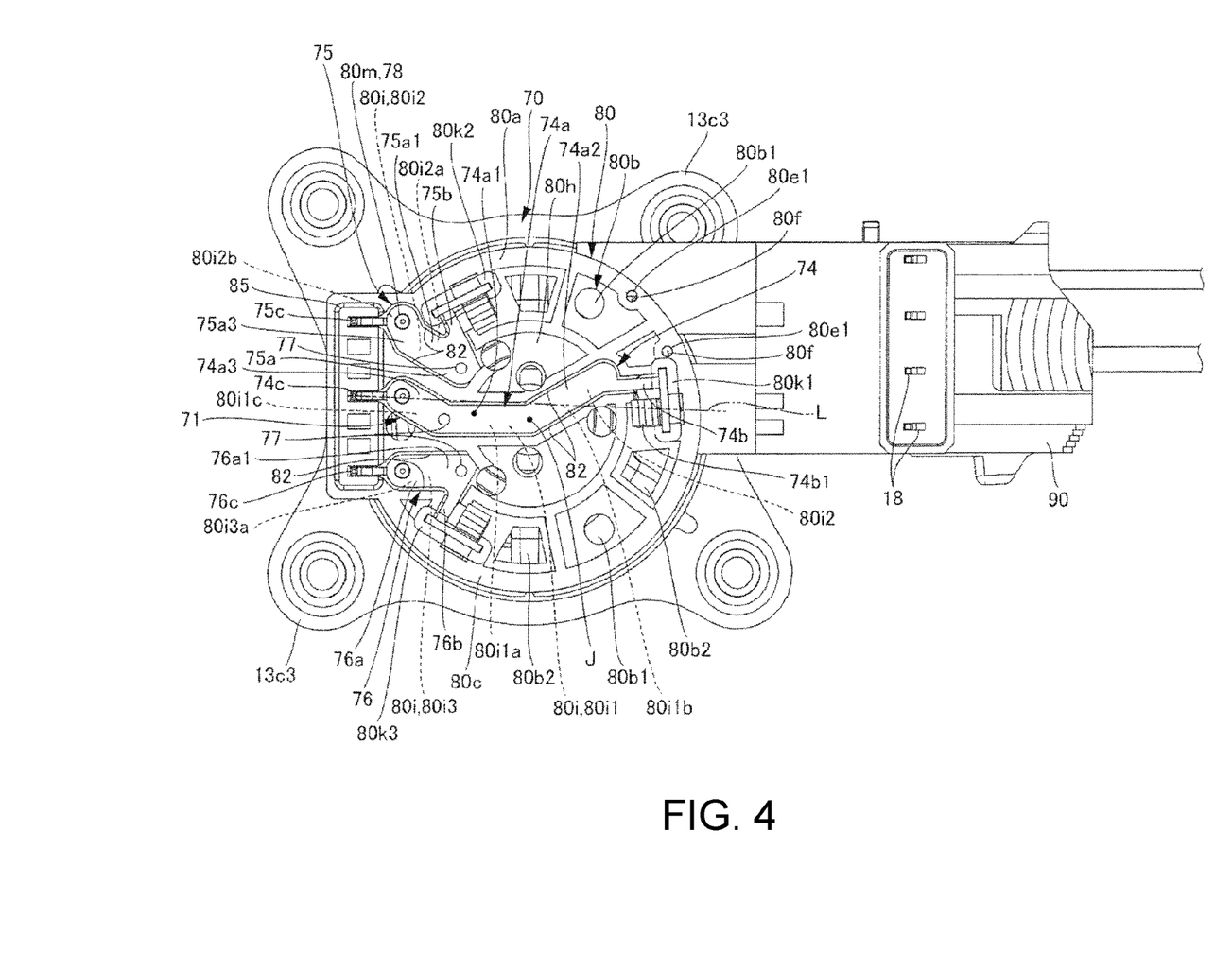
FIG. 4 is a plan view of the bus bar holder according to the first embodiment.

FIG. 3 is an internal perspective view of the motor 10 including a bus bar holder 80 according to the present embodiment. FIG. 4 is a plan view of the bus bar holder 80 according to the present embodiment. As shown in FIG. 3 and FIG. 4, the bus bar assembly 70 is disposed between the rolling bearing holding part 30 and the substrate housing chamber 13b3 (refer to FIG. 1). The bus bar assembly 70 is integrated with the resin housing 13 (refer to FIG. 1) by insert molding. The bus bar assembly 70 is an integrally molded article made of a resin. That is, the bus bar assembly 70 is a primary molded article and the resin housing 13 including the bus bar assembly 70 is a secondary molded article.

The bus bar assembly 70 includes the plurality of bus bars 71 that are electrically connected to the plurality of coils 22b (refer to FIG. 1) of the stator 22 and the bus bar holder 80 that holds the plurality of bus bars 71. The bus bar holder 80 has a plate-like holder body part 80a. The holder body part 80a has a circular shape when viewed in the axial direction.

(Bus Bar Holder 80)

The bus bar holder 80 is disposed at a position orthogonal to the central axis J of the shaft 11. In the shown embodiment, the bus bar holder 80 is disposed at a position that is coaxial with the central axis J of the shaft 11 and orthogonal to the central axis J. The holder body part 80a is disposed on the rear side (+Z side) end of the stator 22. In the present embodiment, the holder body part 80a is placed on the insulator 22d of the motor 10 and the outer diameter of the holder body part 80a is slightly larger than the outer diameter of the insulator 22d.

The holder body part 80a has a plurality of through-holes 80b. The plurality of through-holes 80b are disposed at intervals in the circumferential direction at positions at which the holder body part 80a and the stator 22 overlap in the axial direction. In the present embodiment, the holder body part 80a has a plurality of circular through-holes 80b1 and square through-holes 80b2 in the circumferential direction of the peripheral part of the holder body part 80a. In addition, the holder body part 80a has a plurality of circular through-holes 80b1 in the periphery of the central part of the holder body part 80a.

In these through-holes 80b, during insert molding of the bus bar assembly 70, the resin passes through the through-holes 80b and flows toward the stator 22 and the resin housing 13. Then, when the resin is cured, the holder body part 80a (the bus bar holder 80) is fixed to the stator 22 and the resin housing 13 via the resin that has passed through the through-holes 80b and cured.

Figure 5:
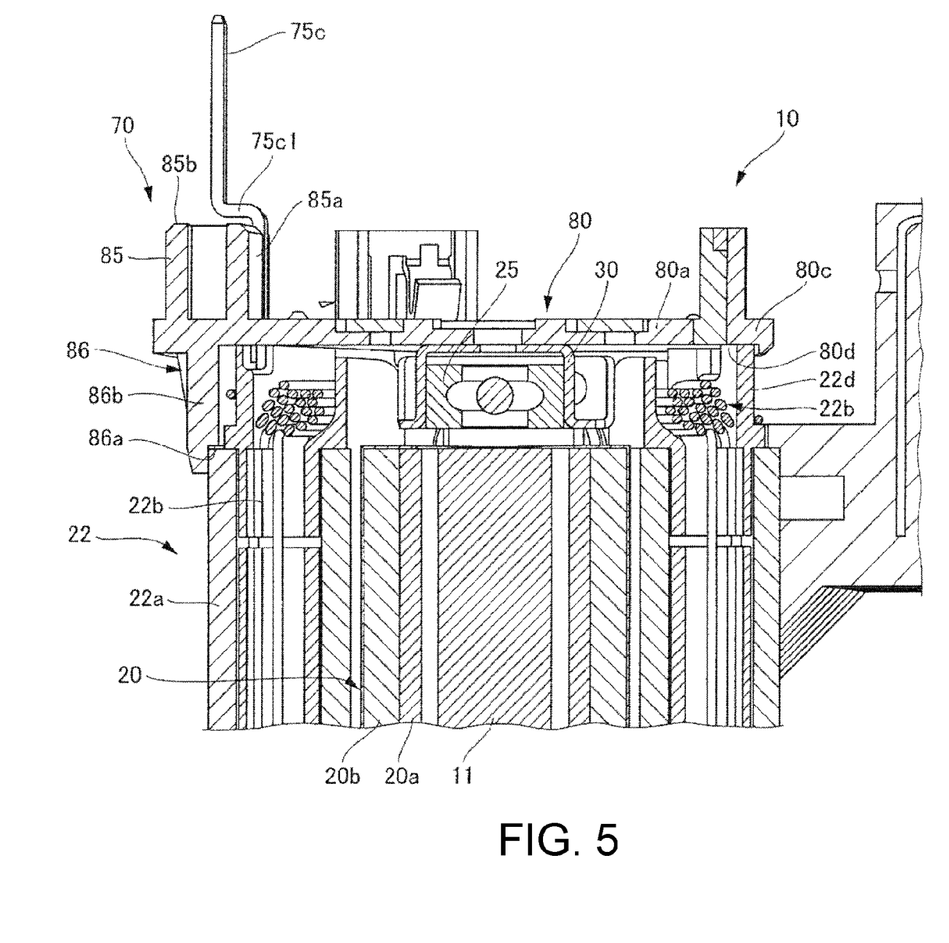
FIG. 5 is a cross-sectional view of the bus bar holder according to the first embodiment.

FIG. 5 is a cross-sectional view of the bus bar holder 80 according to the present embodiment. As shown in FIG. 5, the holder body part 80a has a flange part 80c that protrudes outwardly in the radial direction with respect to the insulator 22d provided in the stator 22. The front side (−Z side) of the flange part 80c has an insertion recess 80d into which a rear side end of the insulator 22d is inserted.

As shown in FIG. 4, a positioning part 80m that protrudes in the axial direction is provided on one of the rear side end of the insulator 22d and the flange part 80c. A positioning hole 80f into which the positioning part 80m is inserted is provided on the other of the rear side end of the insulator 22d and the flange part 80c.

In the present embodiment, a pin 80e1 serving as the positioning part 80m that protrudes in the axial direction is provided at the rear side end of the insulator 22d. Two pins 80e1 are provided at intervals in the circumferential direction of the insulator 22d. On the other hand, two positioning holes 80f are provided at intervals in the circumferential direction in the peripheral part of the holder body part 80a. The pins 80e1 are fitted into these positioning holes 80f, and the holder body part 80a can be positioned in the circumferential direction and in the radial direction with respect to the stator 22. Here, the number of each of the pins 80e1 and the positioning holes 80f may be at least two or three or more.

The holder body part 80a has a terminal holding part 85 that protrudes to the rear side on the left side in the X axial direction. The terminal holding part 85 will be described below in detail.

The holder body part 80a has a flat surface 80h on the rear side. The surface 80h has a plurality of disposition surface parts 80i on which the plurality of bus bars 71 are disposed. In the present embodiment, the disposition surface part 80i has a first disposition surface part 80i1, a second disposition surface part 80i2, and a third disposition surface part 80i3. The first disposition surface part 80i1 extends in the radial direction of the holder body part 80a through the central axis J. The second disposition surface part 80i2 is disposed on the left side in the X axial direction of the holder body part 80a on one side (+side) in the Y axial direction with respect to the first disposition surface part 80i1 and extends to the outside in the radial direction with respect to the central axis J. The third disposition surface part 80i3 is disposed on the left side in the X axial direction on the other side (−side) in the Y axial direction with respect to the first disposition surface part 80i1 and extends in the X axial direction.

The first disposition surface part 80i1 has a first linear center surface part 80i1a that linearly extends to the left side in the X axial direction through the central axis J, a first right extended surface part 80i1b which is connected to the right side end of the first linear center surface part 80i1a in the X axial direction, and linearly extends in a tilted manner to the +side in the Y axial direction toward the right side in the X axial direction, and a first left extended surface part 80i1c which is connected to the left side end in the X axial direction of the first linear center surface part 80i1a, and linearly extends in a tilted manner to the +side in the Y axial direction toward the left side in the X axial direction.

The second disposition surface part 80i2 has a second linear surface part 80i2a which linearly extends along the +side in the Y axial direction of the first left extended surface part 80i1c, and a second left extended surface part 80i2b which is connected to the left side end of the second linear surface part 80i2a in the X axial direction and extends to the outside in the radial direction. The third disposition surface part 80i3 has a third linear surface part 80i3a which is positioned on one side of the first left extended surface part 80i1c in the Y axial direction and linearly extends along the first linear center surface part 80i1a.

The disposition surface part 80i has a pair of guide walls 82 which extend along both side surfaces of the bus bar 71 in the transverse direction and protrude from the disposition surface part 80i, and the bus bar 71 is disposed between the pair of guide walls 82. In the present embodiment, the pair of guide walls 82 are provided on each of both sides of the first disposition surface part 80i1, the second disposition surface part 80i2, and the third disposition surface part 80i3 in the transverse direction.

Figure 6:
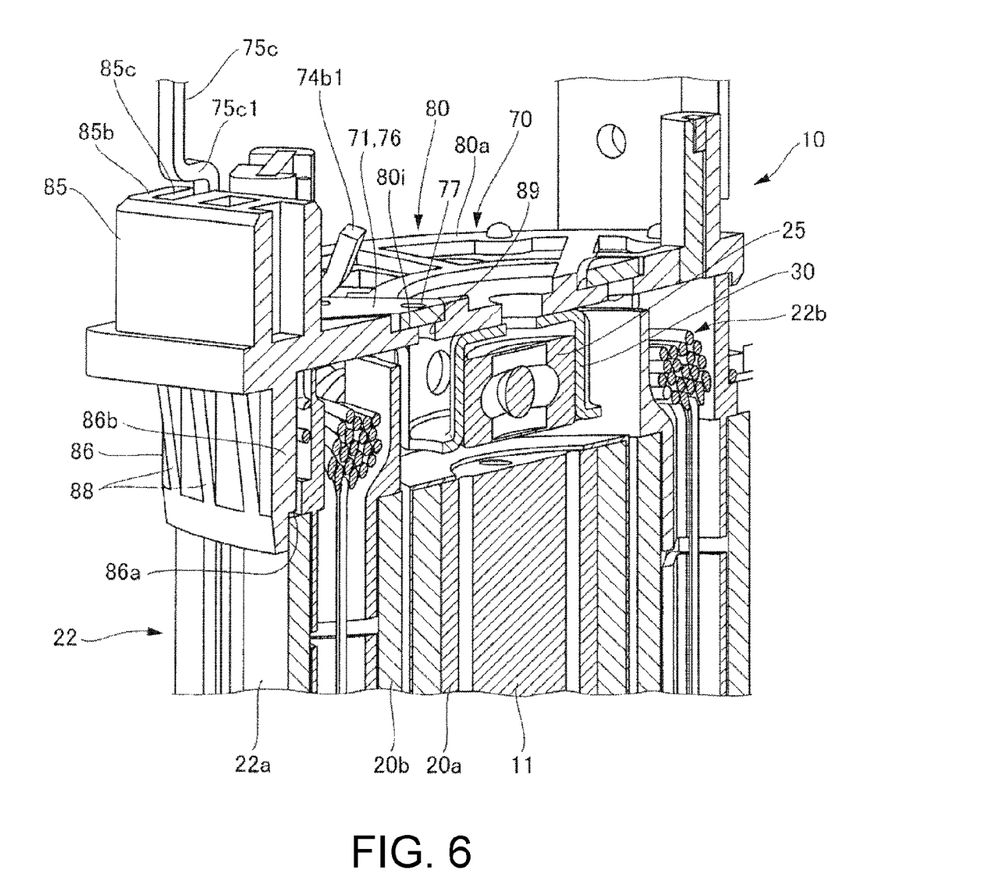
FIG. 6 is a cross-sectional perspective view of a support of the bus bar holder according to the first embodiment.

FIG. 6 is a cross-sectional perspective view of a support 86 of the bus bar holder 80 according to the present embodiment. As shown in FIG. 6, the bus bar holder 80 has the terminal holding part 85 that protrudes to the rear side on the left side in the X axial direction. The terminal holding part 85 has a rectangular parallelepiped shape, and the terminal holding part 85 in a longitudinal direction extends in the Y axial direction. A longitudinal groove 85c that extends along the motor side terminal part 75c of the bus bar 71 is provided on a side surface 85a on the right side and a top surface 85b on the rear side of the terminal holding part 85 in the X axial direction. The longitudinal groove 85c extends in the axial direction and opens to the side surface 85a and the top surface 85b. Here, the longitudinal groove 85c into which the motor side terminals 75c and 76c of a second bus bar 75 and a third bus bar 76 are inserted is provided on one side in the Y axial direction with respect to the longitudinal groove 85c.

The motor side terminal part 75c has a bent part 75c1 at an intermediate part in the axial direction. In the shown embodiment, the bent part 75c1 is bent in a step shape (L-shape) toward the left side in the X axial direction. The motor side terminal parts 74c and 76c have the bent parts 74c and 76c (refer to FIG. 3) similarly to the motor side terminal part 75c.

The front side of the motor side terminal part 75c is inserted into the longitudinal groove 85c. The bent part 75c1 of the motor side terminal part 75c is disposed to face a rear side opening of the longitudinal groove 85c with a gap therebetween. The rear side of the motor side terminal part 75c extends from the bent part 75c1 to the rear side. Therefore, when the bus bar assembly 70 is integrally molded with the resin housing 13, if there is a possibility of the motor side terminal part 75c being pushed and inclined to the left side in the X axial direction due to a resin pressure, since the rear side of the motor side terminal part 75c is inserted into the longitudinal groove 85c, it is possible to reduce a likelihood of the rear side of the motor side terminal part 75c being inclined to the left side in the X axial direction.

In addition, since the motor side terminal part 75c is inserted into the longitudinal groove 85c, a force pressing the motor side terminal part 75c due to a resin pressure is reduced. Therefore, it is possible to further reduce a likelihood of the rear side of the motor side terminal part 75c being inclined to the left side in the X axial direction.

In addition, as shown in FIG. 3 and FIG. 6, the rear side end of the motor side terminal part 75c is welded to and electrically connected to the circuit board 16. When the rear side end of the motor side terminal part 75c is welded to the circuit board 16, there is a possibility of the motor side terminal part 75c expanding in the axial direction due to heat and biasing the circuit board 16. However, when the bent part 75c1 provided in the motor side terminal part 75c is deformed, it is possible to reduce a biasing force applied to the circuit board 16. Here, when the motor side terminal part 75c receives heat and expands, the bent part 75c1 is deformed toward the longitudinal groove 85c. Therefore, since the bent part 75c1 moves in the longitudinal groove 85c, the movement of the bent part 75c1 is not limited.

Here, when the bus bar assembly 70 is integrally molded with the resin housing 13, a resin pressure is applied to the terminal holding part 85, and there is a possibility of the left side of the bus bar holder 80 in the X axial direction being deformed in a direction in which the bus bar holder 80 is folded to the front side via the terminal holding part 85. Thus, the terminal holding part 85 has the support 86 that extends to the front side with respect to a peripheral part of the holder body part 80a. The support 86 has a step 86a that is in contact with the rear side end of the stator 22 of the motor 10.

In the shown embodiment, the support 86 has a wall 86b that is curved along an outer circumferential surface of the rear side end of the stator 22. The wall 86b has a width slightly larger than the width of the terminal holding part 85 in the longitudinal direction (the Y axial direction). The step 86a that is in contact with the rear side end of the stator 22 is provided at the front side end of the wall 86b. Therefore, when the rear side end of the stator 22 is brought into contact with the step 86a, it is possible to support a resin pressure applied to the terminal holding part 85 at the rear side end of the stator 22 via the support 86.

In addition, on the outer surface of the wall 86b in the radial direction, a plurality of ribs 88 that extend in the axial direction are provided at intervals in the circumferential direction.

(Bus Bar 71)

As shown in FIG. 4, the bus bar 71 is made of a metal material, for example, tin-plated copper in which copper is plated with tin. The bus bar 71 includes a first bus bar 74 disposed on the first disposition surface part 80i1, the second bus bar 75 disposed on the second disposition surface part 80i2, and the third bus bar 76 disposed on the third disposition surface part 80i3.

The first bus bar 74 includes a bus bar body part 74a, a coil side terminal part 74b that is connected to one end side of the bus bar body part 74a, and the motor side terminal part 74c that is connected to the other end side of the bus bar body part 74a. The second bus bar 75 includes a bus bar body part 75a, a coil side terminal part 75b that is connected to one end side of the bus bar body part 75a, and the motor side terminal part 75c that is connected to the other end side of the bus bar body part 75a. The third bus bar 76 includes a bus bar body part 76a, a coil side terminal part 76b that is connected to one end side of the bus bar body part 76a, and the motor side terminal part 76c that is connected to the other end side of the bus bar body part 76a.

The bus bar body part 74a of the first bus bar 74 includes a first linear part 74a1 placed on the first linear center surface part 80i1a, a first right extending part 74a2 placed on the first right extended surface part 80i1b, and a first left extending part 74a3 placed on the first left extended surface part 80i1c. The first linear part 74a1 passes over the central axis J. The coil side terminal part 74b connected to a side end of the first right extending part 74a2 has a conductive wire connection part 74b1 that electrically connects the conductive wire 22e of the coil 22b that extends from the stator 22 to the rear side.

The conductive wire connection part 74b1 is supported by a connection terminal holding part 80k1 provided to protrude from a peripheral part on the rear side of the holder body part 80a. In the present embodiment, the coil 22b of the motor 10 is a three-phase winding wire, and in order to connect the coil 22b corresponding to any of a U-phase, a V-phase, and a W-phase to the bus bar 71, three connection terminal holding parts 80k1, k2, and k3 are provided at uniform intervals in the circumferential direction of the peripheral part of the holder body part 80a.

In addition, in the present embodiment, regarding the first bus bar 74, a disposition example of the first bus bar 74 in which, when one end of the first bus bar 74 is connected to the coil 22b of the stator 22 and the other end of the first bus bar 74 is disposed at a position on the side opposite to one end of the first bus bar 74 centered on the central axis J, an imaginary line L connecting one end and the other end of the first bus bar 74 is shifted with respect to the central axis J is shown.

In this case, in the present embodiment, the first linear part 74a1 is disposed at a position crossing the central axis J, the first right extending part 74a2 linearly extends from one end of the first linear part 74a1 in the longitudinal direction toward the connection terminal holding part 80k1, and the first left extending part 74a3 linearly extends from the other end of the first linear part 74a1 in the longitudinal direction toward the terminal holding part 85 that supports the motor side terminal part 75c. Therefore, the first bus bar 74 can be disposed at the closer distance compared to when the first linear part 74a1 does not extend in a direction crossing the central axis J.

Here, while a case in which one side of the first linear part 74a1 in the longitudinal direction is disposed at a position crossing the central axis has been described in the shown embodiment, the intermediate part of the first linear part 74a1 in the longitudinal direction or the other side in the longitudinal direction may be disposed at a position crossing the central axis J.

The bus bar body part 75a of the second bus bar 75 includes a second linear part 75a1 placed on the second linear surface part 80i2a and a second left extending part 75a3 placed on the second left extended surface part 80i2b. The coil side terminal part 75b connected to the right side end of the second linear part 75a1 in the X axial direction is supported by the connection terminal holding part 80k2.

The bus bar body part 76a of the third bus bar 76 includes a third linear part 76a1 placed on the third linear surface part 80i3a. The coil side terminal part 76b connected to the right side end of the third linear part 76a1 in the X axial direction is supported by the connection terminal holding part 80k3.

Each of the first bus bar 74, the second bus bar 75, and the third bus bar 76 has a fixing hole 77 that penetrates therethrough in the axial direction. In the shown embodiment, the first bus bar 74 has the fixing hole 77 at the left side end of the first linear part 74a1 in the X axial direction. The second bus bar 75 has the fixing hole 77 at the right side end of the second linear part 75a1 in the X axial direction. The third bus bar 76 has the fixing hole 77 at the right side end of the third linear part 76a1 in the X axial direction.

On the other hand, as shown in FIG. 4 and FIG. 6, the bus bar holder 80 has a communication hole 89 at a position overlapping the fixing hole 77 of the bus bar 71 when the bus bar 71 is disposed on the disposition surface part 80i. In the present embodiment, the bus bar holder 80 has the communication hole 89 that allows communication with the fixing hole 77 at the left side end of the first linear center surface part 80i1a of the first disposition surface part 80i1 in the X axial direction. In addition, the bus bar holder 80 has the communication hole 89 that allows communication with the fixing hole 77 at the right side end of the second linear surface part 80i2a of the second disposition surface part 80i2 in the X axial direction. In addition, the bus bar holder 80 has the communication hole 89 that allows communication with the fixing hole 77 at the left side end of the third linear surface part 80i3a of the third disposition surface part 80i3 in the axial direction.

Therefore, when the resin flows through the fixing hole 77 and the communication hole 89 during insert molding and the resin is cured in the fixing hole 77 and the communication hole 89, the bus bar 71 can be fixed to the bus bar holder 80 by the cured resin.

The disposition surface part 80i includes the positioning part 80m for positioning the bus bar 71 at a predetermined position on the disposition surface part 80i. The bus bar 71 has a positioning hole 78 to be fitted to the positioning part 80m. In the present embodiment, the positioning hole 78 is provided at the left side end of the first left extending part 74a3 of the first bus bar 74 in the X axial direction. In addition, the positioning hole 78 is provided at the left side end of the second left extending part 75a3 of the second bus bar 75 in the X axial direction. The positioning hole 78 is provided at the left side end of the third linear part 76a1 of the third bus bar 76 in the X axial direction.

On the other hand, the positioning part 80m that passes through the positioning hole 78 is provided at the left side end of the first left extended surface part 80i1c of the first disposition surface part 80i1 in the X axial direction. In the present embodiment, the positioning part 80m is a positioning projection that passes through the positioning hole 78. In addition, the positioning part 80m is provided at the left side end of the second left extended surface part 80i2b of the second disposition surface part 80i2 in the X axial direction. The positioning part 80m is provided at the left side end of the third linear surface part 80i3a of the third disposition surface part 80i3 in the X axial direction.

In the positioning part 80m of the positioning projection that passes through the positioning hole 78, a tip of the positioning part 80m that protrudes from the positioning hole 78 during molding using a mold is crushed and crimped, and the bus bar 71 is positioned on the disposition surface part 80i.

<Pump 40>

As shown in FIG. 1, the pump 40 is disposed on one side of the motor 10 in the axial direction, and specifically, on the front side (−Z side). The pump 40 is driven by the motor 10 via the shaft 11. The pump 40 includes a pump rotor 47 and a pump housing 51. The pump housing 51 includes the pump body 52 and a pump cover 57. These components will be described below in detail.

(Pump Body 52)

The pump body 52 is fixed to the front side (−Z side) of the resin housing 13 on the front side (−Z side) of the motor 10. The pump body 52 includes a housing part 53 in which the pump rotor 47 is housed and has a side surface and a bottom that is disposed on the rear side (+Z side) of the motor 10. The housing part 53 opens to the front side (−Z side) and is recessed to the rear side (+Z side). The shape of the housing part 53 when viewed in the axial direction is a circular shape.

The pump body 52 has a recess 54 that is recessed from a rear side (+Z side) surface to the front side (−Z side). A sealing member 59 is housed in the recess 54. The shape of the recess 54 when viewed in the axial direction is a circular shape.

The pump body 52 has a through-hole 55 that penetrates along the central axis J. Both ends of the through-hole 55 open in the axial direction and the shaft 11 passes therethrough. An opening on the rear side (+Z side) opens to the recess 54. An opening on the front side (−Z side) opens to the housing part 53. The through-hole 55 functions as the sliding bearing 45 that rotatably supports the shaft 11.

Figure 7:
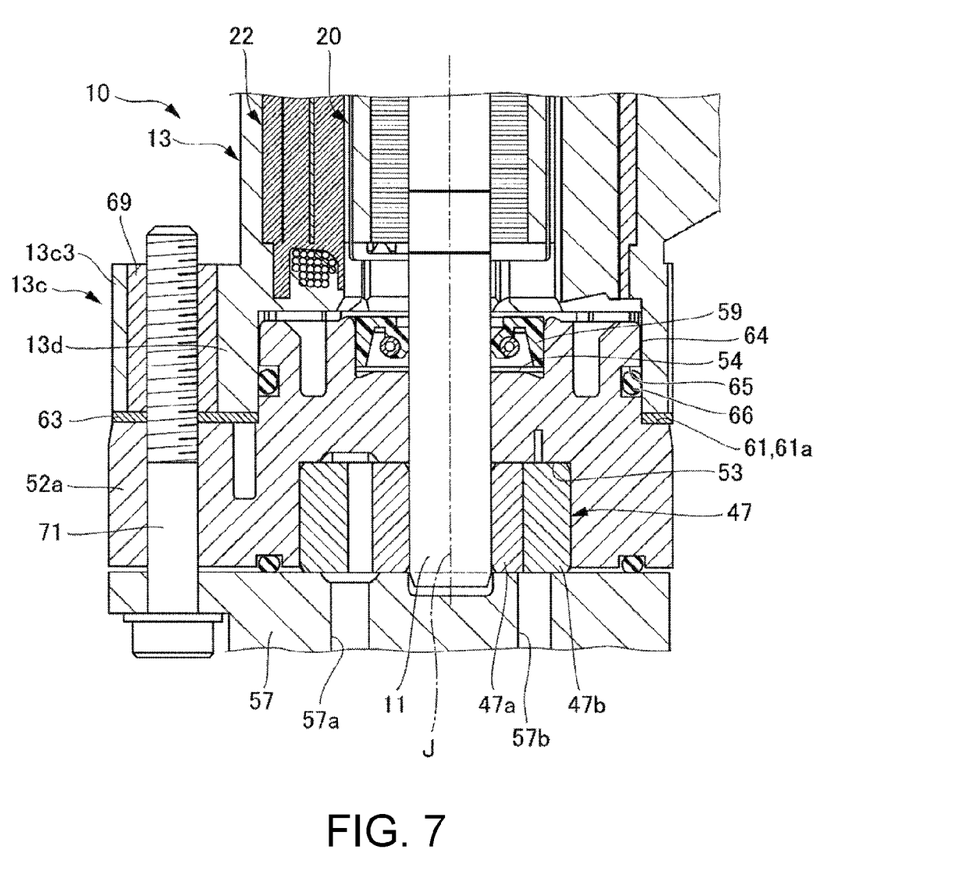
FIG. 7 is an enlarged cross-sectional view of a motor side flange part of a resin housing according to the first embodiment.

FIG. 7 is an enlarged cross-sectional view of the motor side flange part 13c3 of a resin housing 11 according to the first embodiment. The pump body 52 has a step 61 that is recessed inwardly in the radial direction on the outer surface outside the rear side (+Z side) in the radial direction. The step 61 has an end wall surface 61a having a ring shape. When a front side end 13d of the resin housing 13 is brought into contact with the end wall surface 61a, it is possible to position the resin housing 13 with respect to the pump body 52 in the axial direction. In the present embodiment, as shown in FIG. 7, the front side end 13d of the resin housing 13 is in contact with the end wall surface 61a via a metal plate 63 disposed on the end wall surface 61a. The step 61 is disposed between the sealing member 59 provided in the recess 54 and the housing part 53.

In the present embodiment, the metal plate 63 is provided between the resin housing 13 and the pump body 52. In the resin housing 13, knurls are provided on the outer surface, and the collar 69 in which a female thread is provided on the inner circumferential surface is inserted thereinto, and specifically, is inserted on the step 61. The metal plate 63 has a size substantially the same as the size of the front side end 13d of the resin housing 13 in the radial direction. The reason why the metal plate 63 is disposed between the resin housing 13 and the pump body 52 is as follows. The size of the external form of the resin housing 13 cannot be increased because of a relationship with an installation space of the electric oil pump 1. Therefore, the wall thickness of the collar 69 of the resin housing 13 that is in contact with the pump body 52 of the resin housing 13 cannot be sufficiently secured. Therefore, when the resin housing 13 and the pump body 52 are fastened, there is a possibility of the pump body 52 buckling. Therefore, when the metal plate 63 made of iron is placed between the resin housing 13 and the pump body 52, even if the wall thickness of the collar 69 is not sufficiently formed, buckling can be prevented even when the pump body 52 is made of aluminum.

A circumferential wall surface 64 continuously extends to the rear side (+Z side) at the inner end of the end wall surface 61a in the radial direction. An annular recess 65 that is recessed to the inner side in the radial direction is provided on the rear side (+Z side) of the circumferential wall surface 64. In the recess 65, a sealing member 66 is provided. In the shown embodiment, an O-ring is provided in the recess 65.

The pump side flange part 52a is provided on the outer side in the radial direction from the end wall surface 61a of the step 61. The pump side flange part 52a continuously extends in continuation with the end wall surface 61a. In the present embodiment, the four pump side flange parts 52a are provided at intervals in the circumferential direction.

The pump side flange part 52a is disposed to face the motor side flange part 13c3 when the front side end 13d of the resin housing 13 is in contact with the step 61, and when the pump side flange part 52a and the motor side flange part 13c3 are fastened by a fastening unit such as a bolt, the motor 10 can be fixed to the pump 40.

(Pump Rotor 47)

The pump rotor 47 is installed to the shaft 11. More specifically, the pump rotor 47 is installed to the front side (−Z side) of the shaft 11. The pump rotor 47 includes an inner rotor 47a installed to the shaft 11 and an outer rotor 47b that surrounds the outer side of the inner rotor 47a in the radial direction. The inner rotor 47a has an annular ring shape. The inner rotor 47a is a gear having teeth on the outer surface in the radial direction.

The inner rotor 47a is fixed to the shaft 11. More specifically, the front side (−Z side) end of the shaft 11 is press-fitted into the inner rotor 47a. The inner rotor 47a rotates around the axis (θ direction) together with the shaft 11. The outer rotor 47b has an annular ring shape that surrounds the outer side of the inner rotor 47a in the radial direction. The outer rotor 47b is a gear having teeth on the inner surface in the radial direction.

The inner rotor 47a is engaged with the outer rotor 47b and when the inner rotor 47a rotates, the outer rotor 47b rotates. That is, the pump rotor 47 rotates according to rotation of the shaft 11. In other words, the motor 10 and the pump 40 have the same rotation axis. Thereby, it is possible to prevent the size of the electric oil pump 1 from becoming larger in the axial direction.

In addition, when the inner rotor 47a and the outer rotor 47b rotate, a volume between engaging parts of the inner rotor 47a and the outer rotor 47b changes. An area in which the volume decreases is a pressing area, and an area in which the volume increases is a negative pressure area. An intake port is disposed on the front side (−Z side) of the negative pressure area of the pump rotor 47. In addition, a discharge port is disposed on the front side (−Z side) of a pressing area Ap of the pump rotor 47. Here, oil sucked into the housing part 53 from an intake opening 57a provided in the pump cover 57 is stored in a volume part between the inner rotor 47a and the outer rotor 47b and is sent to the pressing area. Then, the oil passes through the discharge port and is discharged from a discharge opening 57b provided in the pump cover 57.

(Pump Cover 57)

As shown in FIG. 1, the pump cover 57 is covered from the front side (−Z side) with respect to the pump body 52, and thus the housing part 53 is provided between the pump cover 57 and the pump body 52. In the present embodiment, the pump cover 57 is installed to the front side (−Z side) of the pump body 52 and blocks an opening 53a that opens to the front side (−Z side) of the housing part 53, and thus the housing part 53 is provided between the pump cover 57 and the pump body 52.

<Operations and Effects of Electric Oil Pump 1>

Next, operations and effects of the electric oil pump 1 will be described. As shown in FIG. 1, when the motor 10 of the electric oil pump 1 is driven, the shaft 11 of the motor 10 rotates, and as the inner rotor 47*a* of the pump rotor 47 rotates, the outer rotor 47*b* also rotates. When the pump rotor 47 rotates, oil sucked from the intake opening 57*a* of the pump 40 moves through the housing part 53 of the pump 40, passes through the discharge port, and is discharged from the discharge opening 57*b*.

(1) Here, in the electric oil pump 1 according to the present embodiment, at least one bus bar 71 among the plurality of bus bars 71 is placed on the disposition surface part 80*i* provided on the bus bar holder 80 and extends in a direction crossing the central axis J. Therefore, when one end of the bus bar 71 is electrically connected to the coil 22*b* of the stator 22 and the other end of the bus bar 71 is disposed at a position on the side opposite to one end of the bus bar 71 centered on the central axis J, the bus bar 71 can be disposed on the disposition surface part 80*i* at the closer distance. Therefore, it is possible to provide the motor 10 (the electric oil pump 1) in which an increase in the length of the bus bar 71 is reduced and cost is reduced.

(2) Since the bus bar 71 linearly extends on the disposition surface part 80*i*, the bus bar 71 can be aligned in the radial direction. Therefore, it is possible to further shorten the length of the bus bar 71 in the longitudinal direction.

(3) Since the bus bar holder 80 is disposed at a position crossing the central axis J, the bus bar 71 can be disposed at the closer distance when the bus bar 71 is placed on the disposition surface part 80*i* of the bus bar holder 80.

(4) Since the housing is the resin housing 13, it is possible to reduce the weight of the motor 10. In addition, since the bus bar assembly 70 is integrated with the resin housing by insert molding, the bus bar assembly 70 is positioned with respect to the resin housing 13 during insert molding. Therefore, it is possible to improve positional accuracy of the bus bar assembly 70 with respect to the resin housing 13.

(5) The bus bar holder 80 has the through-hole 80*b* that opens to both sides in the axial direction, and the bus bar holder 80 is fixed to the resin housing 13 by the resin filled into the through-hole 80*b* during insert molding. Therefore, the bus bar holder 80 can be fixed while it is disposed on the resin housing 13 with high accuracy.

(6) The bus bar holder 80 has the plate-like holder body part 80*a*, the holder body part 80*a* has the surface 80*h* on one side in the axial direction, and the surface 80*h* has the plurality of disposition surface parts 80*i* in which the plurality of bus bars 71 are disposed. Therefore, the plurality of bus bars 71 can be disposed in a corresponding manner.

(7) The disposition surface part 80*i* has the pair of guide walls 82 that extend along both side surfaces of the bus bar 71 in the transverse direction and protrude from the disposition surface part 80*i*, and the bus bar 71 is disposed between the pair of guide walls 82. Therefore, the bus bar 71 can be disposed on the disposition surface part 80*i* corresponding to the bus bar 71, and erroneous disposition can be prevented. In addition, since the pair of guide walls 82 extend along both side surfaces of the bus bar 71, the bus bar 71 can be positioned between the pair of guide walls 82. In addition, it is possible to reduce a likelihood of the bus bar 71 being displaced during insert molding.

(8) The disposition surface part 80*i* has the positioning part 80*m* for positioning the bus bar 71 at a predetermined position on the disposition surface part 80*i*, and the bus bar 71 has the positioning hole 78 to be fitted to the positioning part 80*m*. Therefore, when the positioning part 80*m* is fitted to the positioning hole 78, the bus bar 71 can be positioned on the disposition surface part 80*i*. In addition, it is possible to reduce a likelihood of the bus bar 71 being displaced during insert molding.

(9) Each of the plurality of bus bars 71 has the fixing hole 77, and the bus bar holder 80 has the communication hole 89 at a position overlapping the fixing hole 77 of the bus bar 71 when the bus bar 71 is disposed on the disposition surface part 80*i*. Therefore, when the resin filled into the fixing hole 77 and the communication hole 89 is cured during insert molding, the bus bar 71 can be fixed to the bus bar holder 80 by the cured resin.

(10) The holder body part 80*a* is disposed on one side end of the stator 22 in the axial direction, the holder body part 80*a* has the plurality of through-holes 80*b*, and the plurality of through-holes 80*b* are disposed at intervals in the circumferential direction at positions at which the holder body part 80*a* and the stator 22 overlap in the axial direction. Therefore, in the holder body part 80*a*, when the resin filled into the through-hole 80*b* is cured during insert molding, the holder body part 80*a* can be fixed to the stator 22 and the resin housing 13 by the cured resin.

(11) The holder body part 80*a* has the flange part 80*c* that protrudes outwardly in the radial direction with respect to the insulator 22*d* provided in the stator 22, and the other side of the flange part 80*c* in the axial direction has the insertion recess 80*d* into which one side end of the insulator 22*d* in the axial direction is inserted. Therefore, the holder body part 80*a* can be positioned with respect to the insulator 22*d* in the axial direction. In addition, the positioning part 80*m* that protrudes in the axial direction is provided on one of one side end of the insulator 22*d* in the axial direction or the flange part 80*c*, and the positioning hole 78 into which the positioning part 80*m* is inserted is provided on the other side of one side end of the insulator 22*d* in the axial direction and the flange part 80*c*. Therefore, the holder body part 80*a* can be positioned with respect to the insulator 22*d*.

(12) The terminal holding part 85 has the support 86 that extends to the other side in the axial direction from the peripheral part of the holder body part 80*a*. Therefore, it is possible to prevent a possibility of the motor side terminal parts 74*c*, 75*c*, and 76*c* being inclined due to a resin pressure during insert molding. In addition, the terminal holding part 85 has the support 86 that extends to the other side in the axial direction from the peripheral part of the holder body part 80*a*, and the support 86 has the step 86*a* that is in contact with one side end of the resin housing 13 in the axial direction. Therefore, when a resin pressure is applied to the terminal holding part 85 during insert molding, the resin pressure is supported by one side end of the resin housing 13 in the axial direction via the support 86 and the step 86*a*. Therefore, it is possible to prevent a possibility of the terminal holding part 85 of the holder body part 80*a* being deformed.

(13) Since the outer surface of the support 86 in the radial direction has the rib 88 that extends in the axial direction, it is possible to improve the rigidity of the support 86 in the axial direction.

While embodiments of the present disclosure have been described above, the present disclosure is not limited to such embodiments, and various modifications and alternations within the spirit and scope of the present disclosure can be made. These embodiments and modifications thereof are included in the spirit and scope of the present disclosure and also in the scope of claims and equivalents thereof.

While the electric oil pump 1 in which the pump 40 is integrated with the motor 10 has been described as an example of the motor in the above-described embodiment, the present disclosure is not limited thereto. A motor without the pump 40 may be used.

In addition, while a case in which there are three bus bars 71 corresponding to a U-phase, a V-phase and a W-phase has been described in the above-described embodiment, the present disclosure is not limited thereto. The number of bus bars 71 may be changed according to the number of phases of the motor and the number of slots.

What is claimed is:

1. A motor comprising:
a rotor having a shaft centered on a central axis that extends in an axial direction of the shaft;
a stator which is disposed to face the rotor and comprises a plurality of coils;
a housing in which the rotor and the stator are housed; and
a bus bar assembly that is disposed on one side of the shaft in the axial direction,
wherein the bus bar assembly comprises
a plurality of bus bars that are electrically connected to the plurality of coils of the stator and
a bus bar holder that holds the plurality of bus bars, and
wherein at least one bus bar among the plurality of bus bars is placed on a disposition surface part provided on the bus bar holder and extends in a direction crossing the central axis.

2. The motor according to claim 1,
wherein the at least one bus bar linearly extends on the disposition surface part.

3. The motor according to claim 1,
wherein the bus bar holder is disposed at a position crossing the central axis.

4. The motor according to claim 1,
wherein the housing is a resin housing, and
wherein the bus bar assembly is integrated with the resin housing by insert molding.

5. The motor according to claim 4,
wherein the bus bar holder has a through-hole that opens to both sides in the axial direction, and
wherein the bus bar holder is fixed to the resin housing by a resin filled into the through-hole during insert molding.

6. The motor according to claim 5,
wherein the bus bar holder has a plate-like holder body part,
wherein the holder body part has a surface on the one side in the axial direction, and
wherein the surface has a plurality of the disposition surface parts, and the plurality of bus bars are disposed in the plurality of disposition surface parts respectively.

7. The motor according to claim 6,
wherein each of the disposition surface parts has a pair of guide walls that extend along both side surfaces of the bus bar in a transverse direction and protrude from the disposition surface part, and
wherein the bus bar is disposed between the pair of guide walls.

8. The motor according to claim 7,
wherein each of the disposition surface parts comprises a positioning part for positioning the bus bar at a predetermined position on the disposition surface part, and
wherein the bus bar has a positioning hole to be fitted to the positioning part.

9. The motor according to claim 6,
wherein each of the plurality of bus bars has a fixing hole, and
wherein the bus bar holder has a communication hole at a position overlapping the fixing hole of the bus bar when the bus bar is disposed on the disposition surface part.

10. The motor according to claim 6,
wherein the holder body part is disposed on one side end of the stator in the axial direction,
wherein the holder body part has a plurality of through-holes, and
wherein the plurality of through-holes are disposed at intervals in a circumferential direction at positions at which the holder body part and the stator overlap in the axial direction.

11. The motor according to claim 10,
wherein the holder body part has a flange part that protrudes outwardly in a radial direction with respect to an insulator provided in the stator,
wherein an insertion recess into which one side end of the insulator in the axial direction is inserted, is provided on an other side of the flange part in the axial direction,
wherein a positioning part that protrudes in the axial direction is provided on one of the flange part and the one side end of the insulator in the axial direction, and
wherein a positioning hole into which the positioning part is inserted is provided on the other of the flange part and the one side end of the insulator in the axial direction.

12. The motor according to claim 6,
wherein the bus bar comprises a bus bar body part that is disposed on the disposition surface part and a motor side terminal part which is connected to one end side of the bus bar body part, and is bent and extends to the one side in the axial direction and is connected to a circuit board,
wherein the holder body part has a terminal holding part which is adjacent to the motor side terminal part of the bus bar disposed on the disposition surface part and protrudes from the disposition surface part to the one side in the axial direction,
wherein the terminal holding part has a support that extends to the other side in the axial direction with respect to a peripheral part of the holder body part, and
wherein the support has a step that is in contact with one side end of the resin housing in the axial direction.

13. The motor according to claim 12,
wherein a rib that extends in the axial direction is provided on the outer surface of the support in a radial direction.

* * * * *